(12) United States Patent
Seshadri

(10) Patent No.: US 9,202,470 B2
(45) Date of Patent: Dec. 1, 2015

(54) SPEECH RECOGNITION USING SPEECH CHARACTERISTIC PROBABILITIES

(71) Applicant: Nambirajan Seshadri, Irvine, CA (US)

(72) Inventor: Nambirajan Seshadri, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 309 days.

(21) Appl. No.: 13/755,975

(22) Filed: Jan. 31, 2013

(65) Prior Publication Data

US 2013/0151254 A1    Jun. 13, 2013

Related U.S. Application Data

(63) Continuation of application No. 12/627,879, filed on Nov. 30, 2009, now Pat. No. 8,392,189.

(60) Provisional application No. 61/246,330, filed on Sep. 28, 2009.

(51) Int. Cl.
| G10L 17/06 | (2013.01) |
|---|---|
| G10L 15/28 | (2013.01) |
| G10L 15/00 | (2013.01) |
| G10L 15/183 | (2013.01) |
| G10L 25/00 | (2013.01) |
| G10L 15/14 | (2006.01) |

(52) U.S. Cl.
CPC ............. *G10L 15/28* (2013.01); *G10L 15/005* (2013.01); *G10L 15/183* (2013.01); *G10L 25/00* (2013.01); *G10L 15/142* (2013.01)

(58) Field of Classification Search
CPC ....... G10L 15/005; G10L 15/08; G10L 17/06; G10L 15/142; G10L 15/183; G10L 15/28; G10L 25/00
USPC .............. 704/8, 240, 246, 247, 249, 250, 257
See application file for complete search history.

(56) References Cited

U.S. PATENT DOCUMENTS

| 5,689,616 | A * | 11/1997 | Li ................................. 704/232 |
|---|---|---|---|
| 5,805,771 | A * | 9/1998 | Muthusamy et al. ......... 704/232 |
| 5,895,447 | A * | 4/1999 | Ittycheriah et al. ........... 704/231 |
| 5,953,701 | A * | 9/1999 | Neti et al. ..................... 704/254 |
| 6,182,037 | B1 * | 1/2001 | Maes ............................ 704/247 |
| 6,212,500 | B1 * | 4/2001 | Kohler ......................... 704/256 |
| 6,675,143 | B1 * | 1/2004 | Barnes et al. ................. 704/257 |
| 6,748,356 | B1 * | 6/2004 | Beigi et al. .................... 704/245 |
| 6,832,191 | B1 * | 12/2004 | Frasca et al. .................. 704/257 |
| 7,292,979 | B2 * | 11/2007 | Karas et al. ................... 704/244 |
| 7,949,517 | B2 * | 5/2011 | Eckert et al. ....................... 704/8 |
| 8,099,290 | B2 * | 1/2012 | Suzuki et al. ................ 704/277 |
| 8,214,211 | B2 * | 7/2012 | Yoshioka ...................... 704/239 |
| 8,392,189 | B2 * | 3/2013 | Seshadri ....................... 704/251 |
| 8,635,068 | B2 * | 1/2014 | Pulz et al. ..................... 704/257 |

(Continued)

*Primary Examiner* — Martin Lerner
(74) *Attorney, Agent, or Firm* — Garlick & Markison; Randy W. Lacasse

(57) ABSTRACT

A speech recognition module includes an acoustic front-end module, a sound detection module, and a word detection module. The acoustic front-end module generates a plurality of representations of frames from a digital audio signal and generates speech characteristic probabilities for the plurality of frames. The sound detection module determines a plurality of estimated utterances from the plurality of representations and the speech characteristic probabilities. The word detection module determines one or more words based on the plurality of estimated utterances and the speech characteristic probabilities.

19 Claims, 10 Drawing Sheets

(56) References Cited

U.S. PATENT DOCUMENTS

| | | | |
|---|---|---|---|
| 2003/0086409 A1* | 5/2003 | Karas et al. | 370/350 |
| 2004/0039570 A1* | 2/2004 | Harengel et al. | 704/232 |
| 2004/0215453 A1* | 10/2004 | Orbach | 704/231 |
| 2006/0161434 A1* | 7/2006 | Faisman et al. | 704/246 |
| 2007/0179785 A1* | 8/2007 | Herry et al. | 704/259 |
| 2009/0043575 A1* | 2/2009 | Thompson et al. | 704/230 |
| 2009/0254335 A1* | 10/2009 | Bruckner et al. | 704/8 |
| 2010/0057462 A1* | 3/2010 | Herbig et al. | 704/243 |
| 2010/0223056 A1* | 9/2010 | Kadirkamanathan | 704/235 |
| 2010/0324901 A1* | 12/2010 | Carter et al. | 704/255 |
| 2011/0035219 A1* | 2/2011 | Kadirkamanathan et al. | 704/239 |

* cited by examiner

SPEECH RECOGNITION USING SPEECH CHARACTERISTIC PROBABILITIES

CROSS REFERENCE TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 12/627,879 entitled "Speech Recognition Using Speech Characteristic Probabilities," filed Nov. 30, 2009, issued as U.S. Pat. No. 8,392,189 on Mar. 5, 2013, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 61/246,330, entitled "Speech Recognition Module and Applications Thereof," filed Sep. 28, 2009, now expired.

STATEMENT REGARDING FEDERALLY SPONSORED RESEARCH OR DEVELOPMENT-NOT APPLICABLE

INCORPORATION-BY-REFERENCE OF MATERIAL SUBMITTED ON A COMPACT DISC-NOT APPLICABLE

BACKGROUND OF THE INVENTION

1. Technical Field of the Invention

This invention relates generally to communication systems and more particularly to communication devices using speech recognition within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), WCDMA, LTE (Long Term Evolution), WiMAX (worldwide interoperability for microwave access), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

Regardless of whether a communication device operates within a wireless communication system, a wired communication system, or operates independently, it may include speech recognition functionality. In general, speech recognition circuitry attempts to digitally simulate the human speech production system by creating acoustical filtering operations that operate on frames of digitally represented sound utterances.

Current embodiments of speech recognition systems include a sound front-end, a hidden Markov model (HMM), and a language syntax back-end. The sound front-end extracts acoustic features of speech (e.g., cepstrum). This allows the excitation information of the voiced speech signal (e.g., the cepstrum) and the dynamics of the speech system impulse response to be separately processed. The HMM block functions to determine a most likely utterance from the extracted acoustic features. The language syntax back-end functions to shape the utterances based on language syntax impositions.

While such speech recognition systems function to emulate speech, the acoustic front-end discards a significant amount of information regarding the speech of an individual. Therefore, a need exists for a speech recognition system and applications thereof that utilize additional information.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
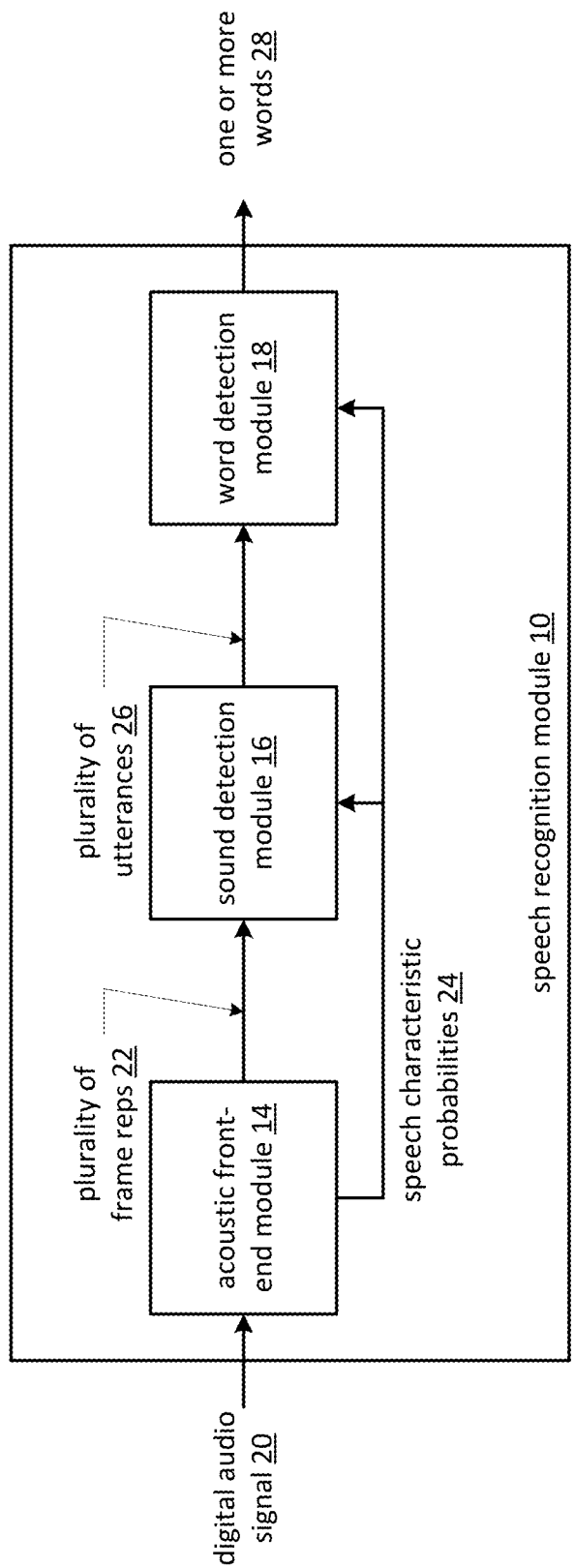
FIG. 1 is a schematic block diagram of an embodiment of a speech recognition system in accordance with the present invention.

FIG. 1 is a schematic block diagram of an embodiment of a speech recognition system 10 that includes an acoustic front-end module 14, a sound detection module 16, and a word detection module 18. Each of the modules 14-18 may be a separate processing module or they may be part of a shared processing module. The processing module(s) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-13.

In an example of operation, the acoustic front-end module 14 receives a digital audio signal 20. The digital audio signal 20 may represent a digitized audio signal, a digitized speech signal, a stored digital audio file, a stored digital voice file, etc. The acoustic front-end module 14 generates a plurality of frames from the digital audio signal. For example, the acoustic front-end module 14 may parse the digital audio signal 20 into a plurality of frames, where each frame has a duration of approximately 10-20 milliseconds.

The acoustic front-end 14 also generates, on frame-by-frame basis, speech characteristic probabilities 24 and a plurality of frame representations 22 for the plurality of frames. The speech characteristic probabilities 24 include, but are not limited to, gender, age, nationality, dialect, accent, pidgin, voiced-unvoiced, sound type, plosives, whisper, voiced plosives, unvoiced plosives, etc. A frame representation 22 may be the samples of the digital audio signal contained in a frame, the conventional acoustic features of the digital audio signal contained in the frame, and/or a combination thereof.

The sound detection module 16 receives the plurality of frame representations 22 and the speech characteristic probabilities 24. From these inputs, the sound detection module 16 determines a plurality of estimated utterances 26. Such a determination may be made on a frame-by-frame basis or multiple frames-by-multiple frames basis. As an example for a frame, the sound detection module 16 selects a known utterance sample from a plurality of known utterance samples (e.g., a codebook of sound utterances) based on the one or more of the speech characteristic probabilities 24 and the representation 22. The selection may also be based on the speech characteristic probabilities 24 and representations 22 of preceding and/or succeeding frames.

The sound detection module 16 then compares the representation 22 of the frame with the known utterance sample. For instance, for example to determine if the acoustic features provided by the representation 2 correlate with the known utterance sample. When the representation 22 compares favorably with the known utterance sample, the sound detection module 16 outputs the known utterance sample as an estimated utterance for the frame.

When the representation 22 compares unfavorably with the known utterance sample, the sound detection module 16 compares the representation 22 with other known utterance samples of the plurality of known utterance samples. When the representation compares favorably with one of the other known utterance samples, the sound detection module 16 outputs the one of the other known utterance samples as the estimated utterance for the frame. If the representation does not compare favorably to any of the other known utterance samples, the sound detection module 16 lowers the level of a favorable comparison and selects one of the known utterance samples based on the adjusted level of comparison.

The word detection module 18 receives the plurality of estimated utterances 26 and the speech characteristic probabilities 24. From these inputs, the word detection module 18 determines one or more words 28. As an example for a word, the word detection module 18 interprets the plurality of speech characteristic probabilities 24 to generate a word bias (e.g., one or more of gender probability, age probability, nationality probability, dialect probability, pidgin probability, accent probability, etc.) and a language syntax bias (e.g.,. rules regarding construction of sentences based on the spoken language, whether it is a first language or second, etc.).

The word detection module 18 biases (e.g., weights) a plurality of words based on the word bias to produce a plurality of biased words and biases a plurality of language syntaxes based on the language syntax bias to produce a plurality of biased language syntaxes. The word detection module 18 then determines an estimated word by comparing at least a portion of the plurality of estimated utterances with the plurality of biased words and the plurality of biased language syntaxes.

The word detection module 18 may determine the estimated word by determining a word probability for each comparison of the at least a portion of the plurality of estimated utterances with the plurality of biased words to produce a plurality of word probabilities and by determining a language syntax probability for each comparison of the at least a portion of the plurality of estimated utterances with the plurality of biased language syntaxes to produce a plurality of language syntax probabilities. The word detection module 18 then interprets the plurality of word probabilities and the plurality of language syntax probabilities to determine the estimated word.

Figure 2:
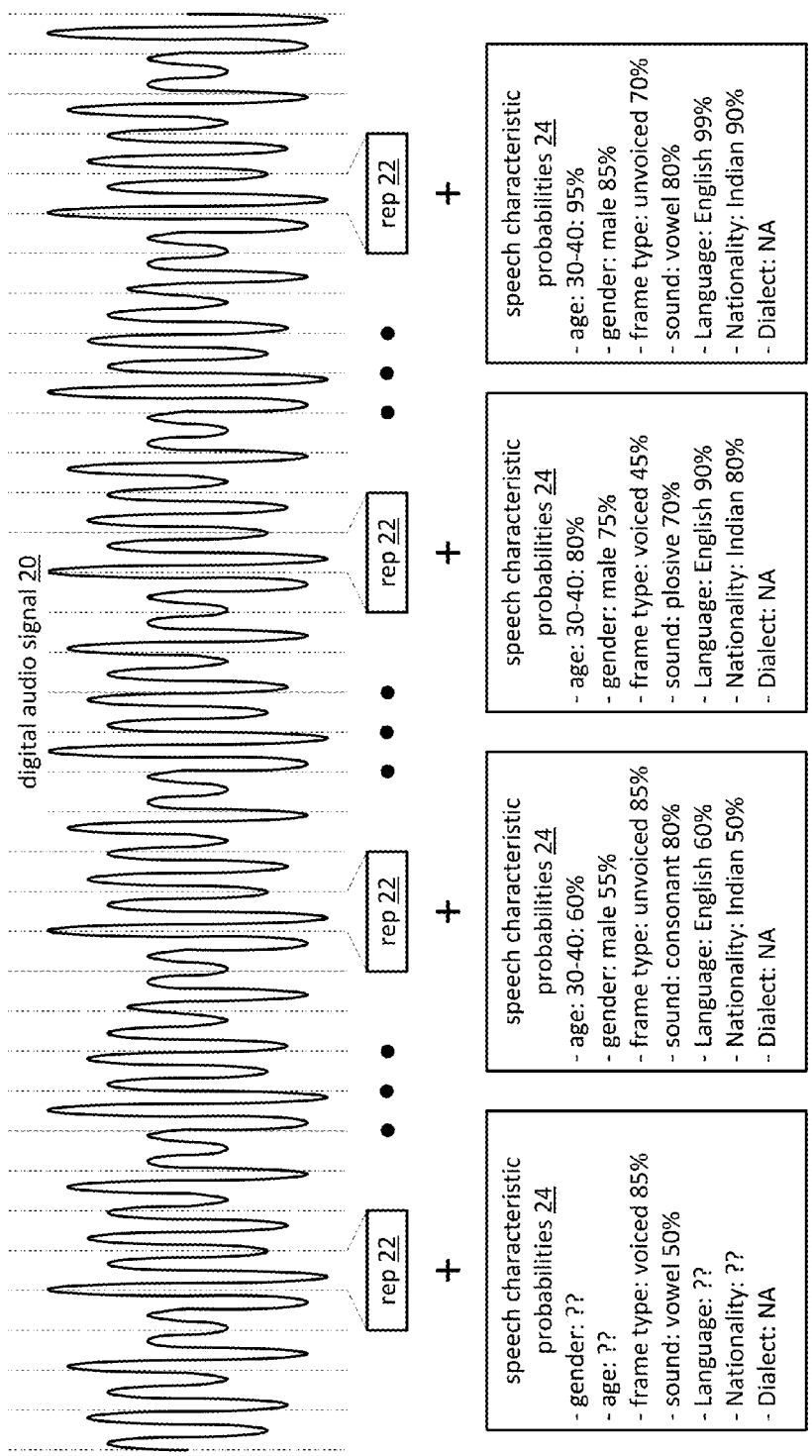
FIG. 2 is a diagram of an example of speech recognition in accordance with the present invention.

FIG. 2 is a diagram of an example of the speech recognition steps performed by the acoustic front-end 14 of the speech recognition module 10 of FIG. 1. In this example, the acoustic front-end 14 receives a digital audio signal 20, which may be representative of a voice signal, an audio signal, a recorded voice signal, an audio file, etc. As shown, the acoustic front-end parses the digital audio signal 20 into a plurality of frames for which representations 22 are created. Each representation 22 includes a corresponding digital signal component of the digital audio signal 20, the acoustic features of the content of the frame, and/or the samples of the frame.

In addition, the acoustic front-end 14 interprets the representation 22 to determine, for each frame or for a group of frames, speech characteristic probabilities 24. The interpretation of a current frame relies on the interpretation of previous frames, especially for non-volatile speech characteristics (e.g., gender, age, language, nationality, accent, dialect, etc.). For instance, early in the digital audio signal 20 (which corresponds to the left side of the figure), the interpretation of the signal 20 may yield lower probability information than later in the signal 20 (where time progresses from left to right in the figure).

In the present example, the speech characteristic probabilities for the first depicted frame 22, the gender, age, language, and nationality (e.g., the non-volatile speech characteristics) cannot be determined with any certainty. The volatile speech characteristics (e.g., frame type and sound type, which potentially change from frame to frame) may be determined in a similar manner as a conventional sound front-end extracts acoustic features of speech (e.g., cepstrum).

For the next depicted frame, which is further later in time than the first depicted frame, the acoustic front-end is able to determine a probability for the non-volatile speech characteristics. In this example, the acoustic front-end 14 determines the gender to be male with a 55% probability, the age of the speaker to be in the 30-40 years old with a 60% probability, the language to be English with a 60% probability, and the nationality of the speaker to be Indian with a 50% probability. The volatile speech characteristics are also determined.

As time of receiving and interpreting the digital audio signal progresses, the interpretation of the non-volatile characteristics improves. For example, the gender improves to a 75% probability and then to an 85% probability. Similarly, the age improves to an 80% and then to a 95% probability. As the probabilities increase, the subsequent processing by the sound detection module 16 and the word detection module 18 is enhanced due to the richer information content.

Figure 3:
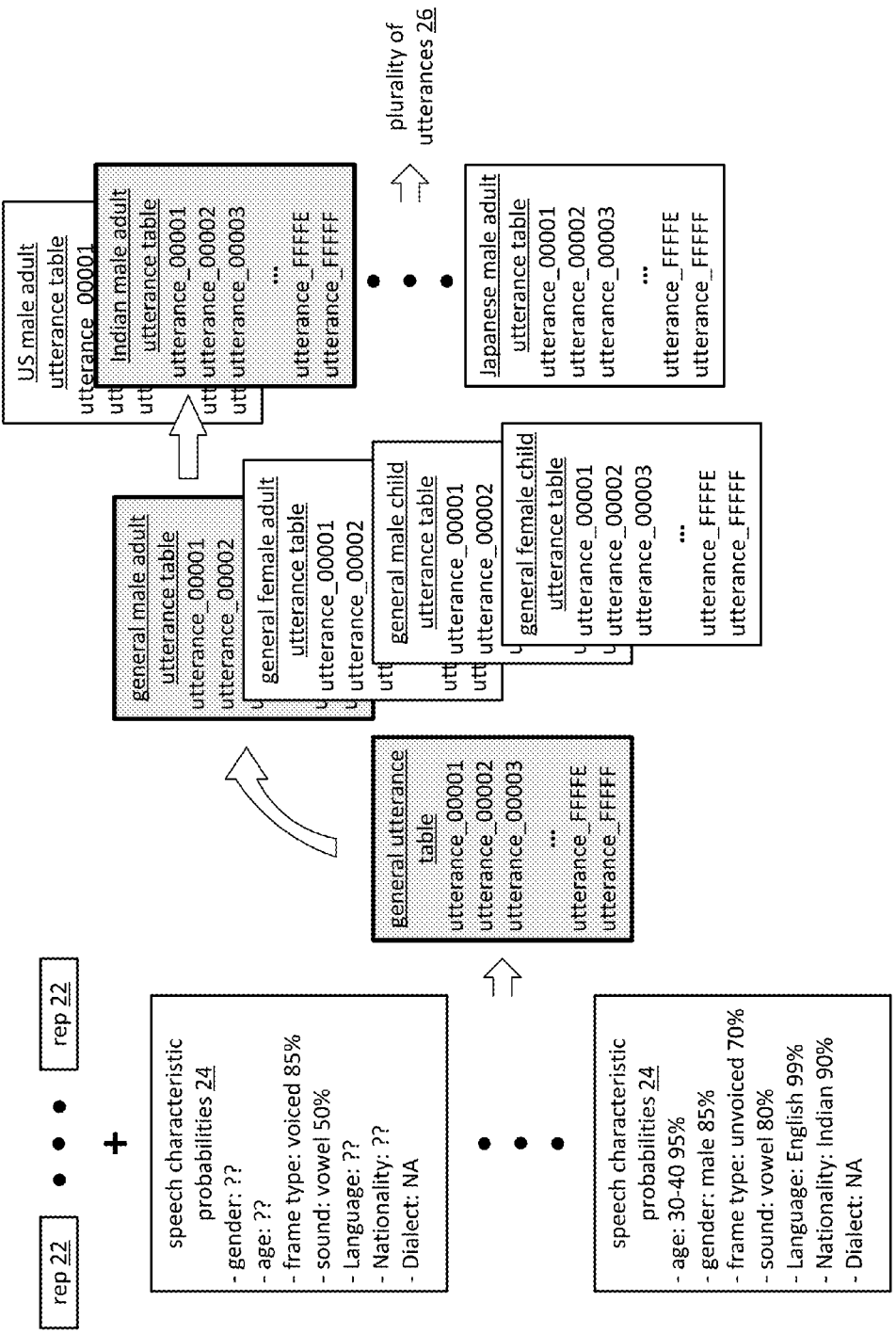
FIG. 3 is a diagram of another example of speech recognition in accordance with the present invention.

FIG. 3 is a diagram of another example of speech recognition steps performed by the sound detection module 16 of the speech recognition module 10 of FIG. 1. In this example, the sound detection module 16 receives the plurality of frame representations 22 and the corresponding speech characteristic probabilities 24. As the sound detection module 16 receives the initial frame representations 22 of the digital audio signal 20 and the corresponding speech characteristic probabilities 24 it may access a general utterance table to determine the estimated utterances (e.g., acoustic features (e.g., linear prediction parameters, cepstrum parameters, and/or related qualities) as used in Hidden Markov Model).

As the speech characteristic probabilities provide greater information, the sound detection module 16 may shift from a general utterance table to one or more specific utterances tables. For instance, as the speech characteristic parameters indicate that the speaker is an adult male, the sound detection module 16 may use an utterance table that includes utterances more tailored to an adult male. The sound detection module 16 may further shift to an Indian male adult utterance table to produce the plurality of utterances 26.

In an alternative embodiment, the sound detection module 16 may access a single utterance table that includes the information of the general utterance table and the more specific utterance tables. In this manner, the sound detection module 16 improves the determination of utterances 26 based on the speech characteristic probabilities.

Figure 4:
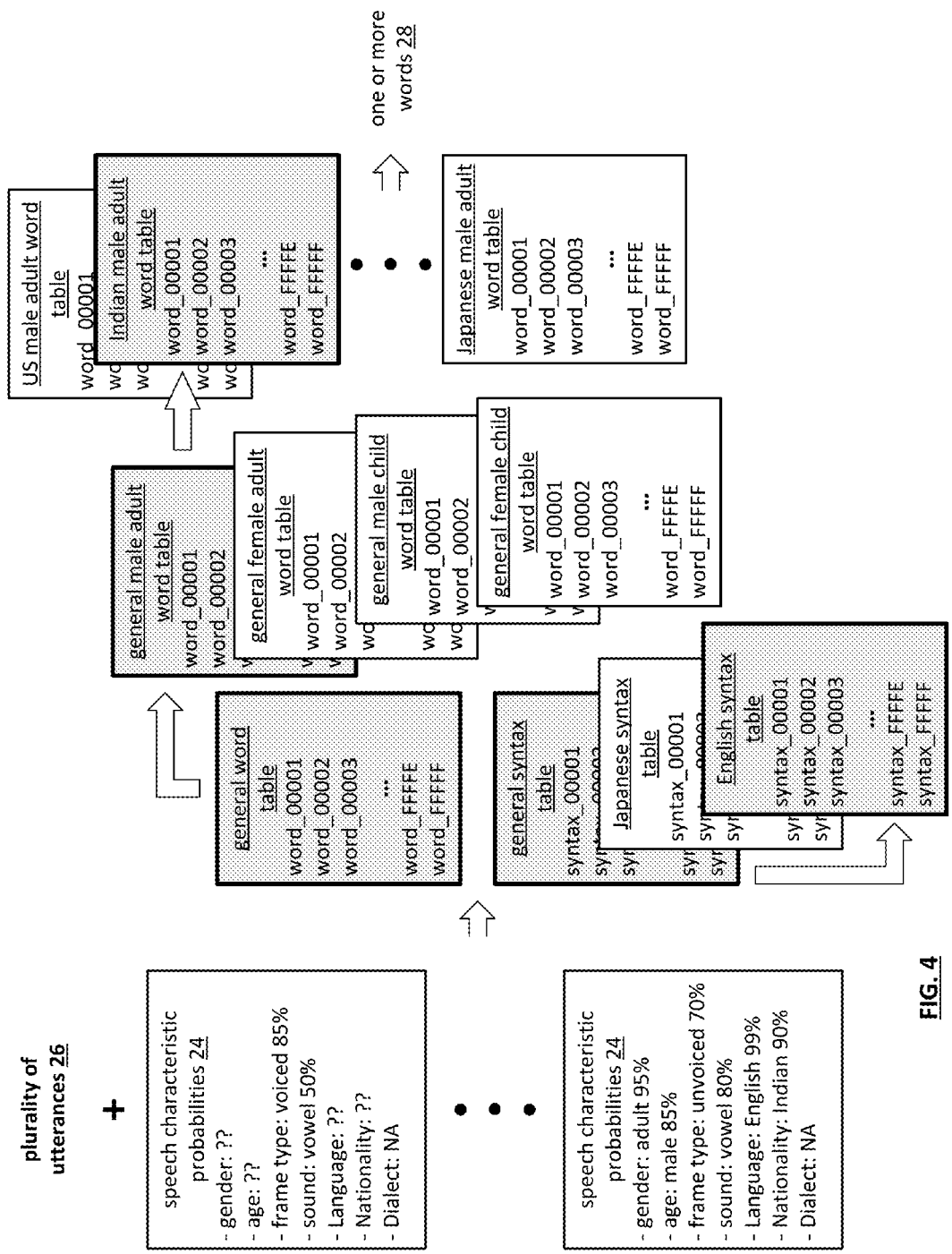
FIG. 4 is a diagram of another example of speech recognition in accordance with the present invention.

FIG. 4 is a diagram of another example of speech recognition steps performed by the word detection module 18 of the speech recognition module 10 of FIG. 1. In this example, the word detection module 18 receives the plurality of utterances 26 and the speech characteristic probabilities 24 to determine one or more words 28. As the word detection module 18 initially interprets the speech characteristic probabilities, there may be little additional information to supplement the word estimation. As such, the word detection module 18 may access a general word table and a general syntax table to render an estimated word.

As the speech characteristic probabilities 24 provide more information, the word determination module 18 may access other, more specific and/or more detailed word tables and syntax tables. For example, as the identity of the speaker is determined to be an adult Indian male speaking English, the word determination module 18 may uses the general male adult word table and/or the Indian male adult word table and may also use the English syntax table. In this manner, the extra information provided in the speech characteristic probabilities 24 enhances the estimation of words 28.

Figure 5:
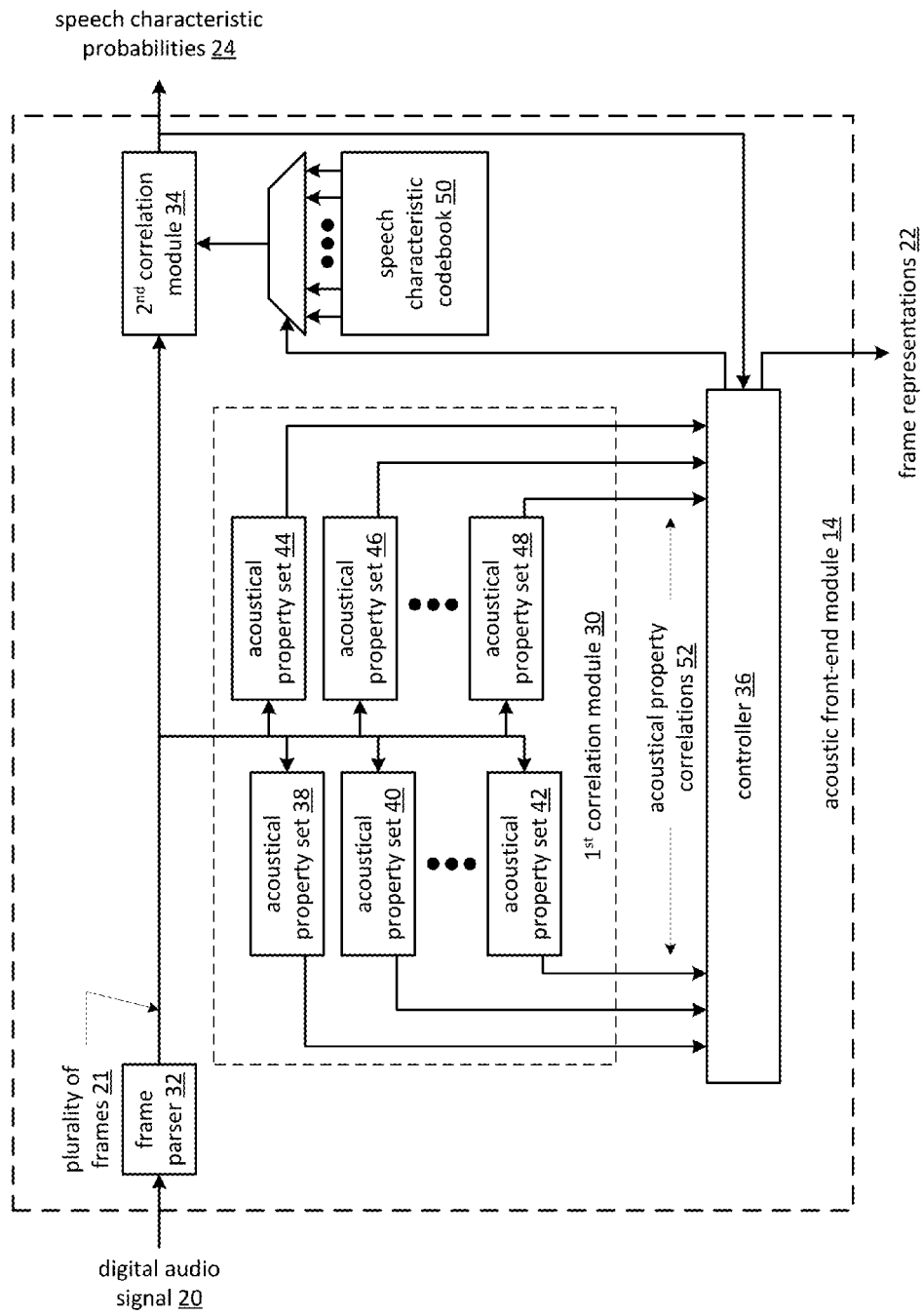
FIG. 5 is a schematic block diagram of an embodiment of an acoustic front-end module in accordance with the present invention.

FIG. 5 is a schematic block diagram of an embodiment of an acoustic front-end module 14 that includes a frame parser module 32, a first correlation module 30, a controller 36, a second correlation module 34, and one or more speech characteristic codebooks 50. The first correlation module 30 may include a plurality of acoustical property sets 38-48.

In an example of operation, the frame parser module 32 receives the digital audio signal 20, which may represent a speech signal that is sampled at an 8 KHz rate. The frame parser module 32 divides the digital audio signal 20 into a plurality of frames 21. For example, the parser module 32 may parse the frames 21 to have an effective frame length of approximately 20 milliseconds. For instance, each frame may be 32 milliseconds in length and include overlapping data with the preceding and/or succeeding frame. For an 8 K-sample per second digital audio signal, a frame includes 256 sample points with 156 of them overlapping with the preceding and/or succeeding frames. Note that other sampling rates, frame lengths, and/or overlapping rates may be used.

The first correlation module 30 correlates each of the plurality of frames 21 with one or more acoustical property sets 38-48 to produce a plurality of acoustical property correlations 52. The acoustical property sets 38-48 include two or more of a first acoustical property set regarding gender; a second acoustical property set regarding age; a third acoustical property set regarding voiced or unvoiced; a fourth acoustical property set regarding a type of sound; a fifth acoustical property set regarding nationality; and a sixth acoustical property set regarding dialect. Each of the acoustic property sets 38-48 includes a plurality of symbols that correspond to its particular speech characteristic.

For instance, the first correlation module 30 may generate an observation vector for a given frame. The observation vector includes acoustic features that help identify the spoken phonemes (e.g., the representation 22 of the frame) and it includes additional information regarding speech characteristics of the speaker. The additional information and/or the acoustic features are compared with the acoustical property sets 38-48 to produce acoustical property correlations 52. For example, the observation vector may be compared or correlated with a plurality of entries in each of the acoustic property sets 38-48, where the controller 36 records each comparison or correlation.

The controller 36 retrieves one or more speech characteristic samples from the speech characteristic codebook 50 based on the plurality of acoustical property correlations 50. For example, the controller 36 analyzes each of the acoustical property correlations 52 to determine one or more likely speech characteristics of the frame. If analysis of the correlations for a given characteristic is inclusive (e.g., can't determine gender with any certainty), the characteristic is ignored for the frame indicated as indeterminate. In addition, the controller 36 outputs the frame representations 22.

The speech characteristic codebook 50, which stores a plurality of speech samples or symbols that includes the various speech characteristics (e.g., gender, age, nationality, dialect, accent, etc.), provides one or more speech characteristic samples to the second correlation module 34. The second correlation module 34 correlates the frame with the one or more speech characteristic samples to produce the speech characteristic probabilities 24. Note that for a given frame, the first correlation module 30 may perform 10s, 100s, 1000s, or more correlations per frame; similarly, the second correlation module 32 may perform 10s, 100s, 1000s, or more correlations per frame to produce the speech characteristic probabilities for the given frame.

Figure 6:
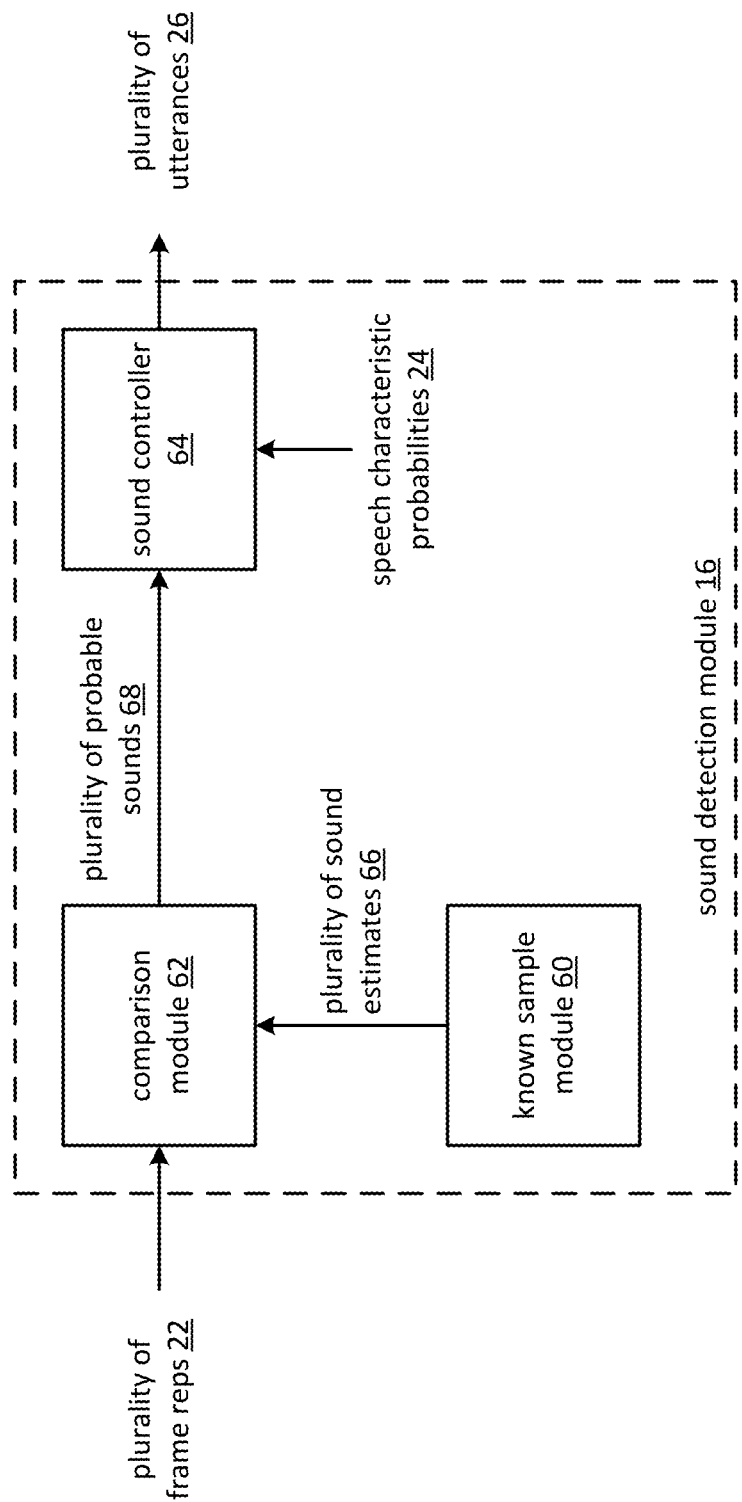
FIG. 6 is a schematic block diagram of an embodiment of a sound detection module in accordance with the present invention.

FIG. 6 is a schematic block diagram of an embodiment of a sound detection module 16 that includes a comparison module 62, a sound controller 64, and a known sample module 60. In an example of operation, the known sample module 60 generates a plurality of sound estimates 66. In one embodiment, the known sample module 60 may include a codebook that is based on a hidden Markov model to provide, in sequence, a plurality of features vectors (e.g., the plurality of sound estimates), which represents the spectral characteristics of the speech in the given frame. Another embodiment of the known sample module 60 will be described with reference to FIG. 7.

The comparison module 62 compares the plurality of sound estimates 66 with the plurality of frame representations 22 to determine a plurality of probable sounds 68. For example, the comparison module 62 may compare a representation 22 with each of the plurality of sound estimates to produce a probable sound 68 for the current frame. In this regard, the comparison module 62 is determining a codebook distortion for each comparison. The smaller the distortion, the more accurately the sound estimate 66 estimates the representation 22.

The sound controller 64 interprets, on a frame-by-frame basis, the plurality of probable sounds 68 in accordance with the speech characteristic probabilities 24 to produce the plurality of estimated utterances 26. In general, the sound controller 64 determines codebook distortion based on the speech characteristic probabilities 24 to improve the selection of the utterances 26.

Figure 7:
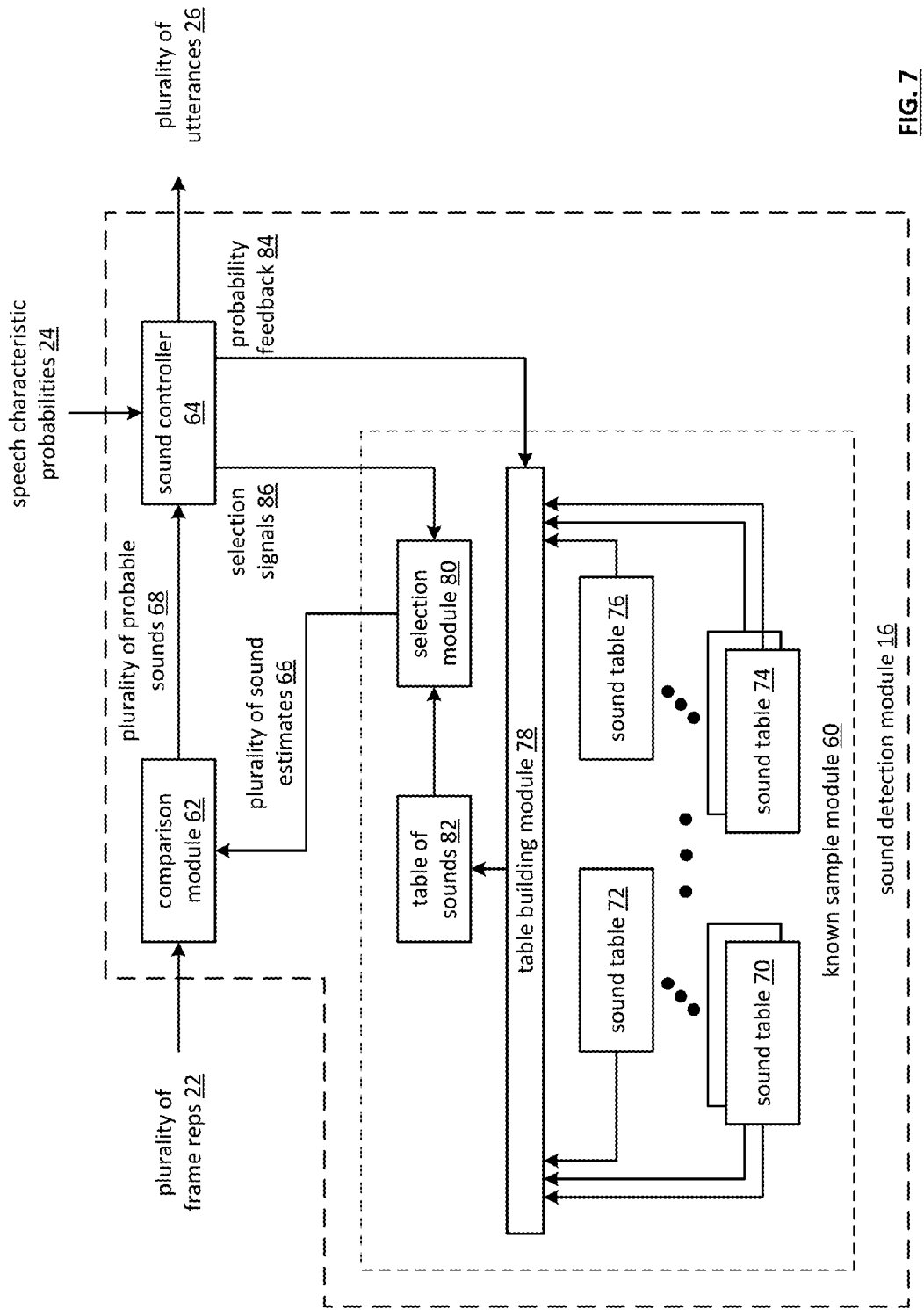
FIG. 7 is a schematic block diagram of another embodiment of a sound detection module in accordance with the present invention.

FIG. 7 is a schematic block diagram of another embodiment of a sound detection module 16 that includes the comparison module 62, the known sample module 60, and the sound controller 64. In this embodiment, the known sample module 60 includes a plurality of sound tables 70-76, a table building module 78, a table of sounds 82, and a selection module 80.

In an example of operation, the comparison module 62, the sound controller 64, and the known sample module 60 form a closed loop system to generate the plurality of utterances 26 from the plurality of frame representations 22 and the speech characteristic probabilities 24. The sound controller 64 generates selection signals 86 and probability feedback 84 based on the probable sounds 68 and the speech characteristic probabilities 24. The sound controller 64 provides the selection signals 86 to the selection module 80 of the known sample module 60 and provides the probability feedback 84 to the table building module 78 of the known sample module 60.

The table building module 78 utilizes the probability feedback 84 to determine which sound table or tables 70-76 to address. For example, each sound table may store sounds corresponding to a particular speech characteristic or group of speech characteristics (e.g., gender, age, dialect, pidgin, accent, nationality, etc.). As a specific example, a sound table may include utterances corresponding to an adult female with a southern drawl; another table may include utterances corresponding to an adolescent male with a Boston accent; etc. The table building module 78 builds the table of sound samples 82 based on the probability feedback 84 such that the resulting table 82 takes into account the speech characteristics of the speaker.

The selection module 80 selects the plurality of sound estimates 66 from the table of sound samples 82 based on one or more selection signals 86. As the loop repeats, the resulting utterances 26 more accurately represent the speaker's spoken utterances and the manner in which they are uttered.

Figure 8:
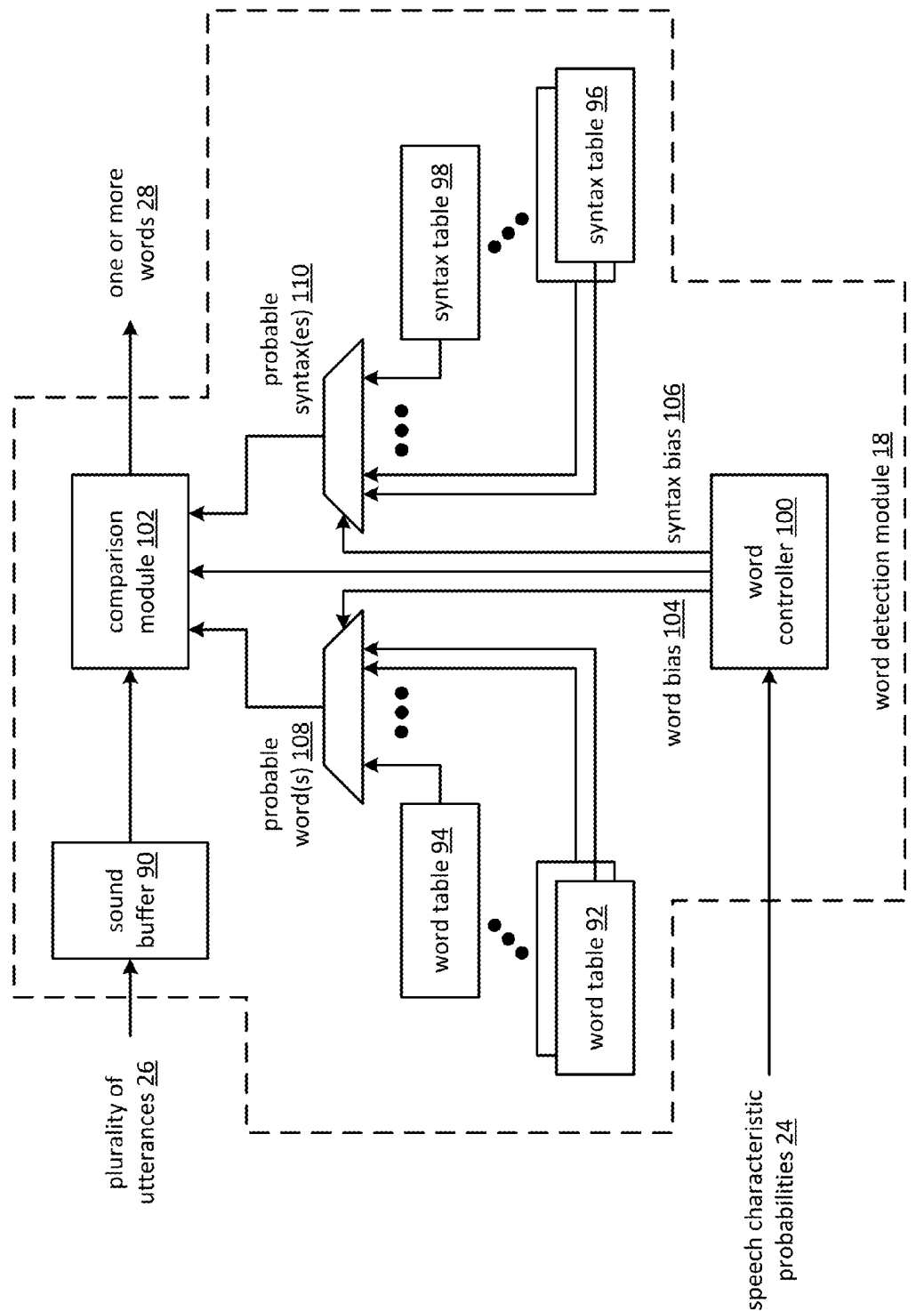
FIG. 8 is a schematic block diagram of an embodiment of a word detection module in accordance with the present invention.

FIG. 8 is a schematic block diagram of an embodiment of a word detection module 18 that includes a sound buffer 90, a plurality of word tables 92-94, a plurality of syntax tables 96-98, a word controller 100, and a comparison module 102. The sound buffer 90 temporarily stores the plurality of estimated utterances 26 for subsequent processing.

The word controller 100 generates a word bias 104 and a syntax bias 106 based on the speech characteristic probabilities 24. For example, if the speech characteristic probabilities 24 indicate that the speaker is an adult Indian male speaking English, the word controller 100 generates the word bias 104 to weight word tables corresponding to English words spoken with an Indian male accent higher than non-English tables and higher than tables corresponding to English words spoken by a female. In furtherance of this example, the word controller 100 generates the syntax bias 106 to weight syntax tables for English with a male Indian accent with higher priority than other syntax tables.

The word controller 100 accesses the plurality of word tables 92-94 based on the word bias 104 to retrieve one or more probable words 108 and accesses the plurality of language syntax tables 96-98 based on the syntax bias 106 to retrieve one or more probable language syntaxes 110. The word controller 100 may repeatedly access the word tables and/or syntax tables to retrieve a plurality of probable words 108 and/or a plurality of probable syntaxes 110 for comparison to one or more particular utterances of the plurality of utterances 26 to enable the comparison module to identify a most probable word of the probable words 108 based on the probable syntaxes 110 to produce the one or more words 28.

In this regard, the comparison module 102 compares the plurality of estimated utterances 26 with the one or more probable words 108 based on the one or more probable language syntaxes 110 to produce the one or more words 28. As an example, the comparison module 26 compares, or correlates, a given set of utterances with the probable word 108 in light of the probable syntax 110 to generate a word, which may have some distortion (e.g., the resulting word is not an identical match to the given set of utterances). The lower the distortion, the more accurately the word represents the given set of utterances. Typically, the word exhibiting the lowest distortion is the one outputted by the comparison module 102.

Figure 9:
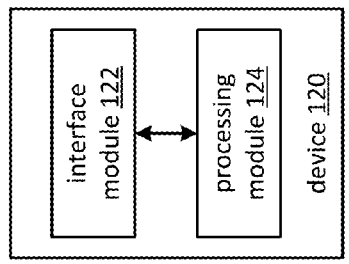
FIG. 9 is a schematic block diagram of an embodiment of a device in accordance with the present invention.

FIG. 9 is a schematic block diagram of an embodiment of a device 120 that includes a processing module 124 and an interface module 122. The device 120 may be a wired or wireless communication device. For example, the device 120 may be a cellular telephone, a VoIP telephone, a wireline telephone, a computer, a digital voice recorder, a video recorder, etc. Regardless of the particular type of device, the processing module 124 is configured to provide a speech recognition module, which may be similar to module 10 as previously described with reference to FIGS. 1-9.

Figure 10:
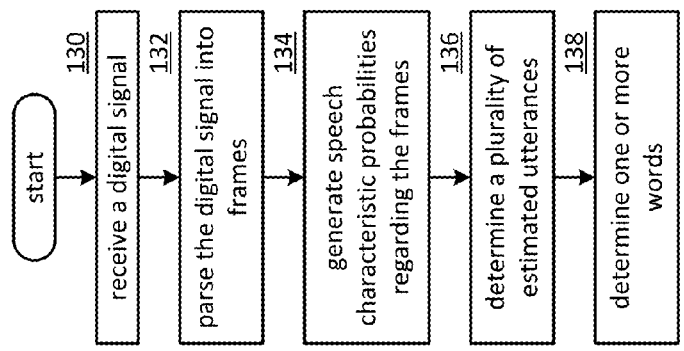
FIG. 10 is a logic diagram of an embodiment of a method for speech recognition in accordance with the present invention.

FIG. 10 is a logic diagram of an embodiment of a method for speech recognition that begins at step 130 where the processing module 124 receives a digital signal from the interface module 122. For example, the digital signal may be a digital audio signal such as signal 20 of FIG. 1 or another digital signal that includes an audio component and/or a speech component.

The method continues at step 132 where the processing module 124 parses the digital signal into a plurality of frames and creates representations thereof. For example, a representation may be a frame worth of samples of the digital signal, may be a digital signal component, and/or may be conventional acoustic features of the digital signal.

The method continues at step 134 where the processing module 124 generates speech characteristic probabilities regarding the plurality of frames. Examples of this have been discussed with reference to one or more of FIGS. 1-9. The method continues at step 136 where the processing module 124 determines a plurality of estimated utterances. This may be done an utterance-by-utterance basis, where the processing module determines an estimated utterance by interpreting one or more representations of the plurality of frames in accordance with one or more of the speech characteristic probabilities.

The method continues at step 138 where the processing module 124 determines one or more words by interpreting the plurality of estimated utterances in accordance with at least one of the speech characteristics probabilities. In this manner, the speech characteristic probabilities improve the speech recognition processing by providing enhanced data for processing.

Figure 11:
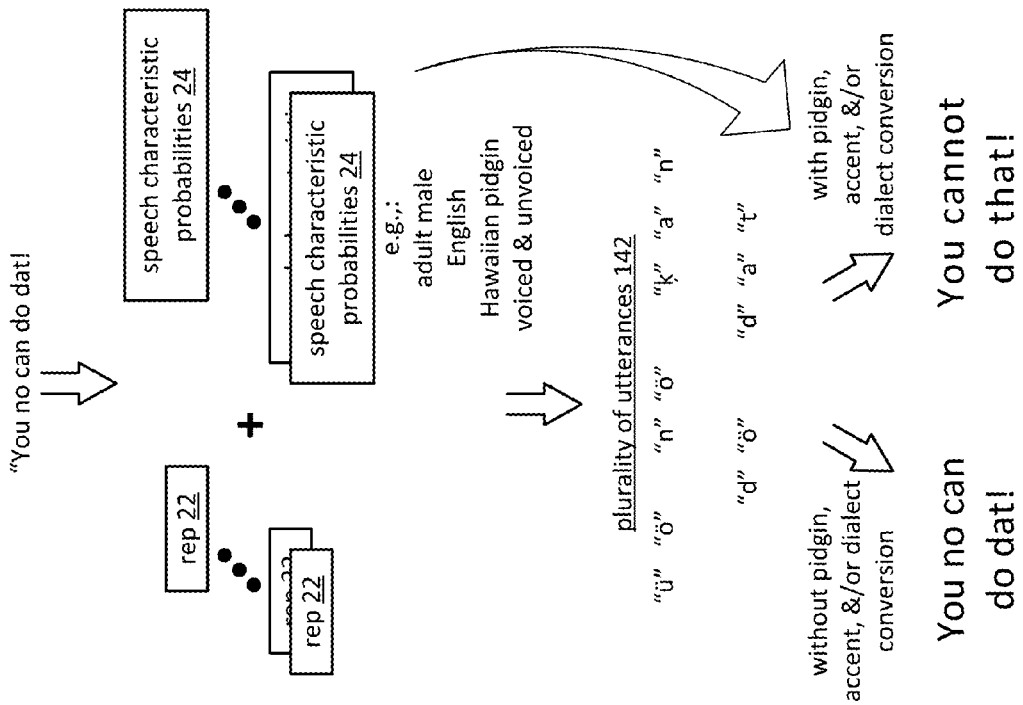
FIG. 11 is a diagram of another example of speech recognition in accordance with the present invention.

FIG. 11 is a diagram of another example of speech recognition where the Hawaiian pidgin phrase "You no can do dat!" is processed by the speech recognition module 10 and/or processing module 124. The module generates a plurality of frame representations 22 and speech characteristic probabilities as previously discussed. With reference to this example, the speech characteristic probabilities 24 indicate that the speaker is an adult male, he is speaking English, he is speaking Hawaiian pidgin, and the frames vary between voiced and unvoiced.

From the representations 22 and speech characteristic probabilities 24, the module 10 and/or 124 determines a plurality of utterances 142. In this example, the plurality of utterances include the phonetic representations of "u", "o", "k", "a", "n", "d", "o", "d", "a", and "t". The module 10 and/or 124 may process the utterances 142 into words by including the pidgin or with a pidgin conversion.

The example without the pidgin conversion yields the spoken words of "You no can do dat". The example with pidgin conversion yields the words, "You cannot do that!". In this example, the module performs speech recognition and may further perform speech conversion and/or interpretation. This concept may be expanded to conversion between languages (e.g., from English to Japanese, etc.).

Figure 12:
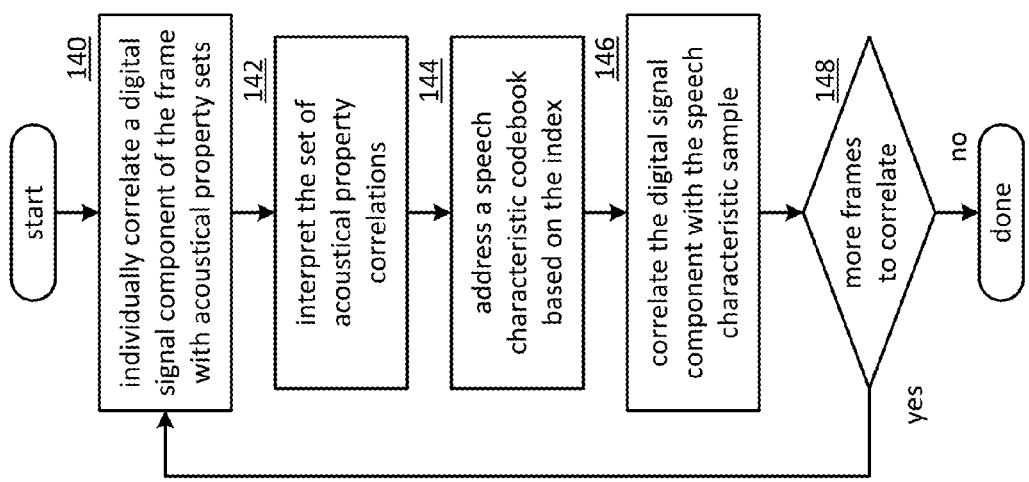
FIG. 12 is a logic diagram of another embodiment of a method for speech recognition in accordance with the present invention.

FIG. 12 is a logic diagram of another embodiment of a method for speech recognition that begins at step 140 where, on a frame-by-frame basis, the processing module 124 individually correlates a digital signal component of the frame with at least some of a plurality of acoustical property sets to produce a set of acoustical property correlations. For example, the plurality of acoustical property sets includes two or more of: a first acoustical property set regarding gender, a second acoustical property set regarding age, a third acoustical property set regarding voiced or unvoiced, a fourth acoustical property set regarding a type of sound, a fifth acoustical property set regarding nationality, and a sixth acoustical property set regarding dialect.

The method continues at step 142 where the processing module 124 interprets the set of acoustical property correlations to produce an index. The method continues at step 144 where the processing module 124 addresses a speech characteristic codebook (e.g., the sound tables, the word tables, and/or the syntax tables) based on the index to retrieve a speech characteristic sample.

The method continues at step 146 where the processing module 124 correlates the digital signal component with the speech characteristic sample to produce the speech characteristic probability for the frame. The method continues at step 148 where the processing module determines whether there are more frames to process. If yes, the process repeats at step 140 for another frame. If not, the method of creating speech characteristic probabilities for the digital signal is complete.

Figure 13:
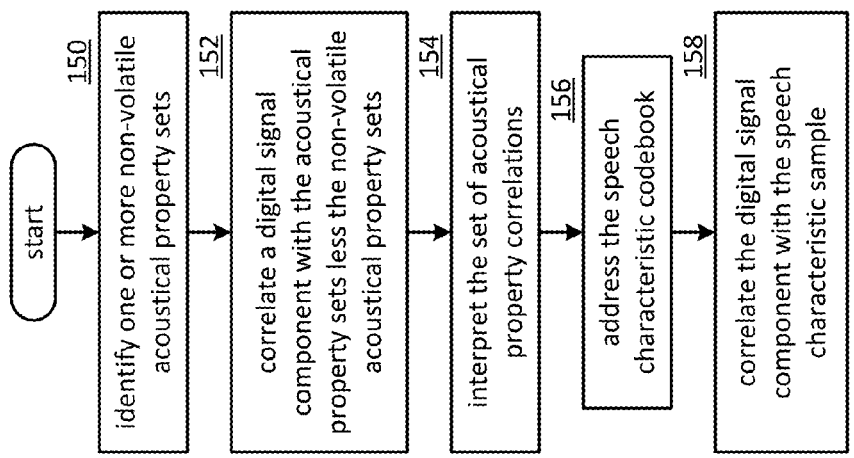
FIG. 13 is a logic diagram of another embodiment of a method for speech recognition in accordance with the present invention.

FIG. 13 is a logic diagram of another embodiment of a method for speech recognition, in particular, generating speech characteristic probabilities. The method begins at step 150 where the processing module 124 identifies one or more non-volatile acoustical property sets (e.g., gender, age, nationality, accent, etc.) of the at least some of the plurality of acoustical property sets having, for preceding frames, a favorable acoustical property correlation.

The method continues at step 152 where the processing module 124 individually correlates a digital signal component of a frame with the at least some of the plurality of acoustical property sets less the one or more non-volatile acoustical property sets to produce a third set of acoustical property correlations. In this instance, once a non-volatile characteristic is determined with a high degree of probability (e.g., adult male), there is no need to continue to determine it for subsequent frames. Hence it is excluded from this step.

The method continues at step 154 where the processing module 124 interprets the third set of acoustical property correlations with respect to the one or more non-volatile acoustical property sets to produce a third index. The method continues at step 156 where the processing module addresses the speech characteristic codebook based on the third index to retrieve a third speech characteristic sample. The method continues at step 158 where the processing module correlates the third digital signal component with the third speech characteristic sample to produce the speech characteristic probability for the further subsequent frame.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An acoustic front-end device comprising:
   a frame parser receiving an acoustic signal and parsing the received acoustic signal into a plurality of frames;
   a plurality of correlators, each of the correlators correlating each of the plurality of frames with one or more acoustic property sets to produce a first set of acoustic property correlations;
   a controller
   retrieving one or more speech characteristic samples from one or more speech codebooks based on the first set of acoustic property correlations; and
   a speech characteristic probability generator configured to:
      generate a plurality of speech characteristic probabilities over one or more subsequent frames of the plurality of frames by individually correlating a digital signal component of the subsequent frame with the one or more acoustic property sets to produce a second set of acoustic property correlations; and
   a processor configured to interpret the plurality of speech characteristic probabilities to generate at least a language probability and a language syntax bias; and
   select a plurality of words from a series of plurality of words based on the language probability and the language syntax bias; and
   output the plurality of words through an interface.

2. The device of claim 1, wherein the controller retrieving one or more speech characteristic samples from the one or more speech codebooks is further configured to:
   interpret a set of the acoustical property set correlations to produce a first index;
   and address the one or more speech codebooks based on the first index to retrieve the one or more speech characteristic samples.

3. The device of claim 1, wherein the one or more speech codebooks store a plurality of the speech characteristic samples comprising a plurality of speech characteristics.

4. The device of claim 3, wherein the plurality of speech characteristics comprises any of: gender, age, nationality, dialect or accent.

5. The device of claim 1, wherein at least one of the one or more speech codebooks comprises any of: sound tables, word tables or syntax tables.

6. The device of claim 1, wherein at least one of the one or more speech codebooks is based on a hidden Markov model.

7. The device of claim 6, wherein the one or more codebooks based on the hidden Markov model provide, in sequence, a plurality of features vectors representing spectral characteristics of speech for a given frame for the plurality of frames.

8. The device of claim 1, wherein the controller analyzes each of the acoustic property set correlations to determine one or more likely speech characteristics of the frame.

9. The device of claim 8, wherein, if the controller when analyzing each of the acoustic property set correlations, for a specified speech characteristic of the one or more likely speech characteristics, cannot determine conclusively that the specified speech characteristic is present, it ignores the specified speech characteristic.

10. The device of claim 2 further comprising:
   interpreting the second set of acoustical property correlations with respect to the speech characteristic probability for the subsequent frame to produce a second index;
   addressing the one or more speech codebooks based on the second index to retrieve a second speech characteristic sample; and correlating the digital signal component with the second speech characteristic sample to produce the speech characteristic probability for the subsequent frame.

11. The device of claim 10, wherein the processor is further configured to:
   interpret the plurality of speech characteristic probabilities to further generate a word bias and
   select a plurality of words from the series of plurality of words based on the word bias.

12. A method for frame-by-frame analyzing of an acoustic signal to determine speech characteristics comprising:
   configuring a processor to:
   parse the acoustic signal into a plurality of frames;
   correlate each of the plurality of frames with one or more acoustic property sets to produce a first set of acoustic property correlations and first index;
   retrieve one or more first speech characteristic samples from one or more speech codebooks based on the first index; and
   generate a plurality of speech characteristic probabilities for a subsequent frame of the plurality of frames by:
      individually correlating a digital signal component of the subsequent frame with the one or more acoustical property sets to produce a second set of acoustic property correlations and a second index;
      addressing the one or more speech codebooks based on the second index to retrieve a second speech characteristic sample; and
      correlating the digital signal component with the second speech characteristic sample to produce the speech characteristic probability for the subsequent frame; and
   retrieving and outputting words based on a language probability and a language syntax bias of the plurality of speech characteristic probabilities.

13. The method claim 12, wherein the retrieving one or more speech characteristic samples from the one or more speech codebooks further comprises:
   interpreting a third set of acoustic property correlations to produce a third index; and
   addressing the one or more speech codebooks based on the third index to retrieve one or more third speech characteristic samples.

14. The method of claim 12 further configuring the processor to analyze each of the acoustic property set correlations to determine one or more likely speech characteristics of the frame.

15. The method of claim 12, wherein the first and second speech characteristic samples comprise a plurality of speech characteristics comprising any of: gender, age, nationality, dialect or accent.

16. The method of claim 12, wherein at least one of the one or more speech codebooks comprises any of: sound tables, word tables or syntax tables.

17. The method of claim 12 further comprising configuring the processor to:
   interpret the plurality of speech characteristic probabilities to generate a word bias;
   select the plurality of words from a series of plurality of words based on the word bias; and
   output the one or more words through an interface.

18. An acoustic front-end device comprising:
   a frame parser receiving an acoustic signal and parsing the received acoustic signal into a plurality of frames;
   a plurality of correlators, each of the correlators correlating each of the plurality of frames with the one or more acoustic property sets to produce a first set of acoustic property correlations;
   a controller, the controller retrieving one or more first speech characteristic samples from one or more speech codebooks based on the acoustic property set correlations;
   a speech characteristic probability generator generating speech characteristic probabilities for a subsequent frame of the plurality of frames by:
   individually correlating a digital signal component of the subsequent frame with the one or more acoustical property sets to produce a second set of acoustic property correlations
   addressing the one or more speech codebooks based on the second set of acoustic property correlations to retrieve a second speech characteristic sample; and
   correlating the digital signal component with the second speech characteristic sample to produce the speech characteristic probability for the subsequent frame; and
   a processor, the processor:
      interpreting the plurality of speech characteristic probabilities to generate at least a language probability, word bias, and language syntax bias;
      selecting a plurality of words from a series of plurality of words based on the word bias and language probability; and
      selecting a plurality of language syntaxes from a series of plurality of language syntaxes based on the language probability.

19. The device of claim 18, wherein at least one of the one or more speech codebooks is based on a hidden Markov model.

* * * * *